United States Patent
Gu (10) Patent No.: US 6,504,578 B1
(45) Date of Patent: Jan. 7, 2003

(54) APPARATUS AND METHOD FOR DETECTING VERTICAL SYNCHRONIZING SIGNAL OF DIGITAL TV

(75) Inventor: Young Mo Gu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/401,373

(22) Filed: Sep. 22, 1999

(30) Foreign Application Priority Data

Sep. 25, 1998 (KR) ............................................ 98-40044
Nov. 7, 1998 (KR) ............................................ 98-47669

(51) Int. Cl.$^7$ ................................................ H04N 5/06
(52) U.S. Cl. ........................ 348/521; 348/500; 348/525; 375/364
(58) Field of Search ................................. 348/521, 529, 348/530, 525, 500, 531, 533; 375/365, 366, 367, 368, 369, 364; H04N 5/06

(56) References Cited

U.S. PATENT DOCUMENTS

| | | | | |
|---|---|---|---|---|
| 6,069,667 A | * | 5/2000 | Ueda et al. ................. | 348/525 |
| 6,104,435 A | * | 8/2000 | Kim ............................ | 348/531 |
| 6,144,413 A | * | 11/2000 | Zatsman ..................... | 348/525 |
| 6,175,391 B1 | * | 1/2001 | Kwak ......................... | 348/725 |
| 6,233,295 B1 | * | 5/2001 | Wang ......................... | 375/364 |
| 6,272,186 B1 | * | 8/2001 | Bontu et al. ................ | 375/365 |

* cited by examiner

Primary Examiner—John Miller
Assistant Examiner—Trang U. Tran
(74) Attorney, Agent, or Firm—Birch, Stewart, Kolasch & Birch, LLP

(57) ABSTRACT

An apparatus and method for detecting a vertical synchronizing signal in a digital TV receiver using a VSB system is disclosed. The present invention includes a vertical obtaining the correlation between a received signal and a previously set vertical synchronizing signal, detecting the position of a symbol having a maximum correlation in every field to output the detected position, and checking the reliability of the output of the maximum value position detector.

23 Claims, 6 Drawing Sheets

APPARATUS AND METHOD FOR DETECTING VERTICAL SYNCHRONIZING SIGNAL OF DIGITAL TV

BACKGROUND OF THE INVENTION

1. Field of the Invention

The present invention relates to a digital TV receiver and more particularly to detecting a vertical synchronizing signal in a digital TV receiver using a vestigial sideband (VSB) system.

2. Discussion of Related Art

As the next generation of digital TV system, the High Definition Television (HDTV) has been continually developing to ultimately bring the theater right into the living room of a viewer. When compared with an existing analog TV, a digital TV not only has a higher resolution and a larger size in the horizontal direction, but produces a vivid sound comparable to a compact disc via a multi-channel. However, due to the many ways to transmit the data, a standardization of the digital TV (DTV) are still being settled among mainly U.S.A, Europe and Japan.

In U.S.A., a VSB system proposed by Zenith has been adapted as a transmission format, a Motion Picture Expert Group (MPEG) has been adapted as a video compression format, a Dolby AC-3 has been adapted as an audio compression format, and an existing but compatible display method has been adapted as a display format. To transmit compressed image data under the above standards for a DTV, an error correction coding (ECC) is executed on the compressed image data. Particularly, a synchronizing signal is inserted between data at predetermined periods before transmission, thereby facilitating the recovery of the data at a receiving side.

The synchronizing signal is classified into two kinds, where one is a horizontal synchronizing (hsync) signal commonly called 'a data segment synchronizing signal', and the other is a vertical synchronizing (vsync) signal commonly called 'a field synchronizing signal'. The hsync and vsync signals of the digital TV differ from the horizontal and vertical synchronizing signals of a National Television System Committee (NTSC) television.

Figure 1:
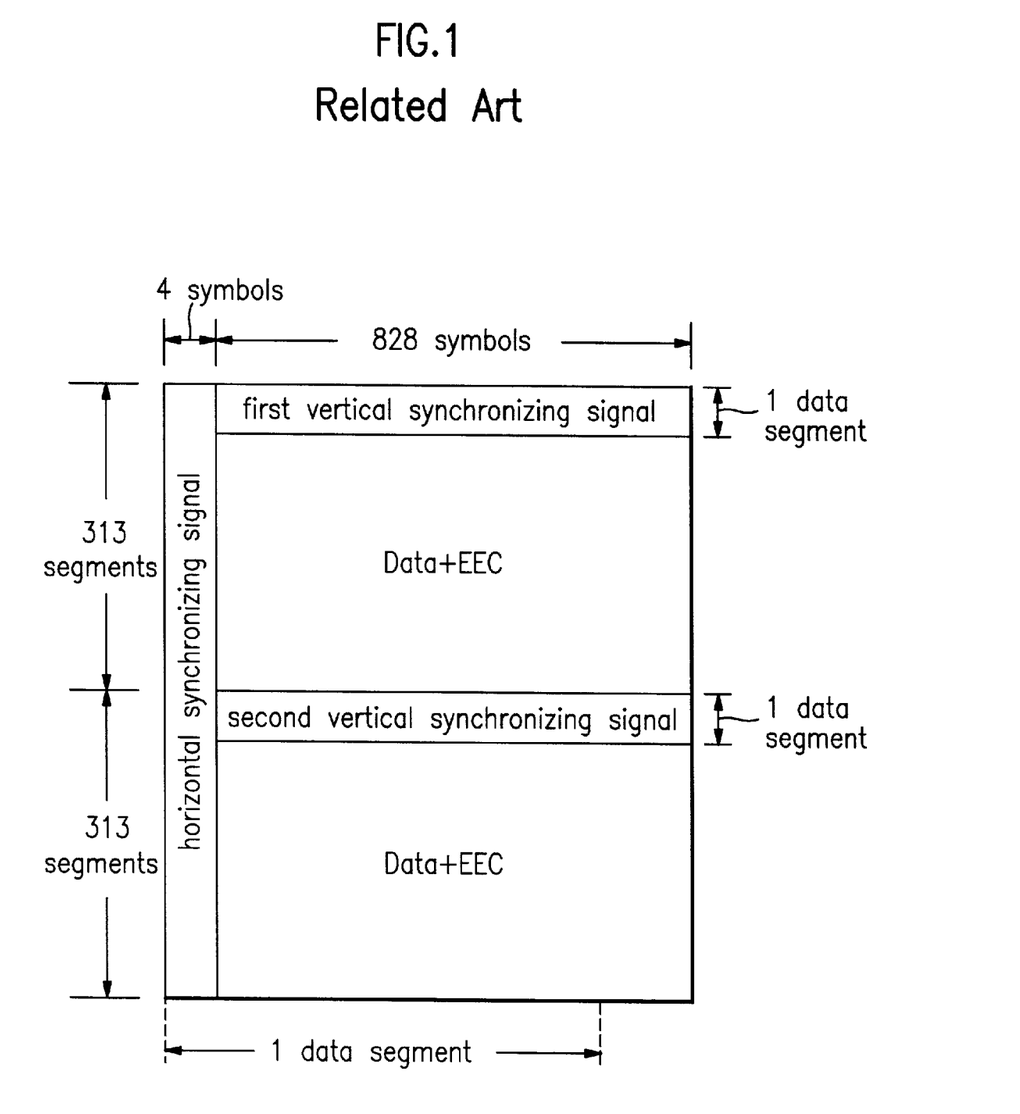
FIG. 1 is a structure of transmission data frame in a typical digital TV.

FIG. 1 shows a transmission signal frame of the digital TV in a VSB system. As shown, one frame is comprised of two fields, where each field includes 313 data segments and where each data segment includes 832 symbols of 4 hsync signals and 828 data symbols. Because the hsync signal does not undergo the ECC process, each data segment includes 4 symbols of hsync signal and 828 symbols of ECC signal. Also, each field includes 313 data segments, one of which is a vsync segment containing a training sequence and the remaining 312 are general data segments.

Also, before transmission from a transmitting side such as a broadcasting station, the signal to be transmitted is passed through a mapper by which the signal is changed into desired power levels. For a ground broadcasting type of 8 VSB, the output level of the mapper corresponds to one of 8-step symbol values (amplitude level). Moreover, according to predetermined agreement, the mapper forcibly inserts the 4 symbols of the hsync signal for every 832 symbols and forcibly inserts the vsync signal in the position of every 313th data segments. Furthermore, with two logic levels, a prescribed logic level of the hsync signal '1, 0, 0, 1' is continually repeated in every data segment.

Figure 2:
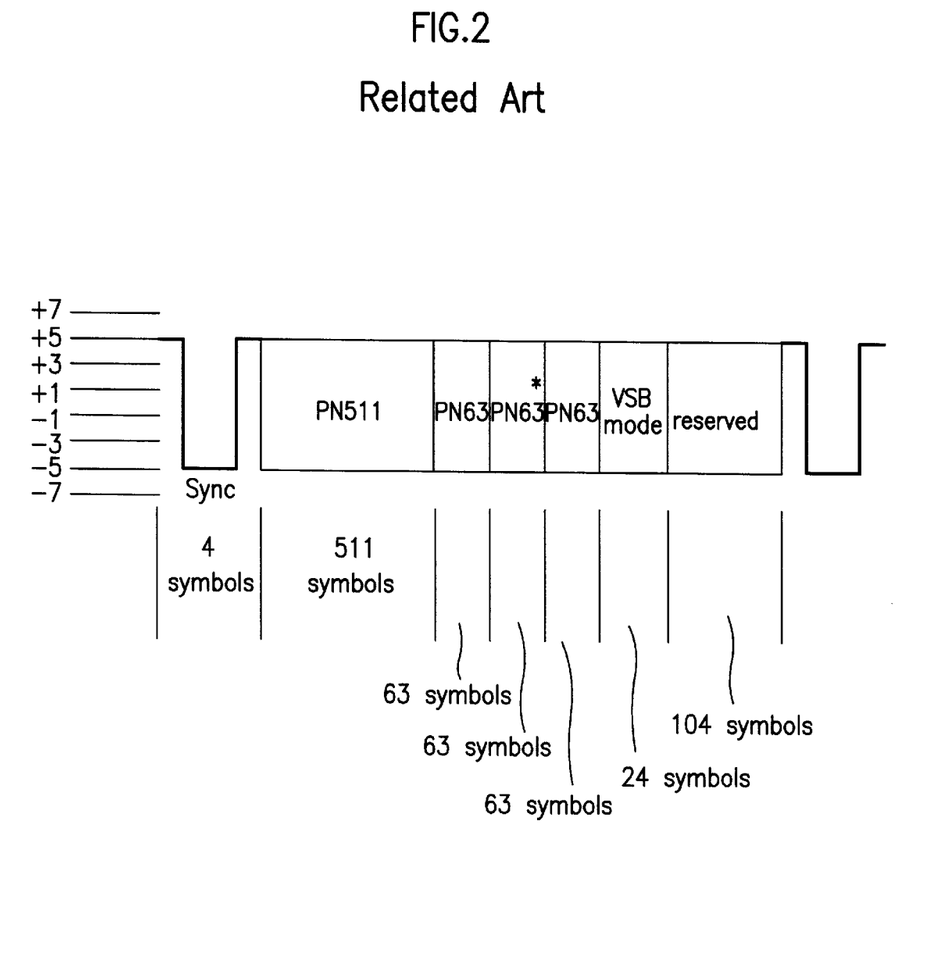
FIG. 2 is a structure of a vsync signal of FIG. 1.

FIG. 2 shows the vsync signal of one data segment length, arranged in order from a hsync pattern '1001' positions of four symbols, a training sequence positions of an adaptive equalizer for signal waveform equalization, a VSB mode signal position, and a reserved area. As shown, the training sequence is made of one PN 511 signal sequence and three PN 63 signal sequences, in which the second PN $63^+$ signal sequence changes its polarity, i.e. from '1' to '0' or from '0' to '1', for every field.

The hsync signal serves to determine the starting position of a data segment and also to recover the timing of the system. In other words, the receiving system first detects the hsync signal for the data recovery, and utilizing the detected hsync signal, recovers the timing and the vsync signal. However, even when the logic level symbols ('1001') of the hsync signal is repeated in every data segment, it is difficult to detect in damaged channels due to ghosts of a large size. If the hsync signal is not detected, the system timing and the vsync signal detection cannot be recovered, thereby either delaying or impeding the data recovery.

Therefore, a general data symbol which allows a system timing recovery without utilizing a hsync signal is disclosed in "A BPSK/QPSK timing-error detector for sampled receivers," IEEE transactions on communications, Vol. COM-34, No. 5, May 1986. According to the disclosed method, detection of the hsync signal is not required for the system timing recovery. Nevertheless, the hsync signal is still required for the data recovery and must be recovered.

SUMMARY OF THE INVENTION

Accordingly, an object of the present invention is to solve at least the problems and disadvantages of the related art.

An object of the invention is to allow detection of a vsync signal prior to a hsync signal in a digital TV.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for detecting a vsync signal in a digital TV comprises a vsync correlating unit obtaining a correlation between a received VSB signal and a previously determined vsync signal; a maximum value position detector detecting the position of a symbol having a maximum correlation with the vsync signal in every field to output the detected position; and a reliability measurer preventing a wrong position determination of the vsync signal.

Preferably, a hsync signal is detected at a position relative to the vsync signal output from the reliability measurer. Also, a vsync signal in the next field is detected at a position relative to the vsync signal output from the reliability measurer.

According to another aspect of the present invention, a method for detecting a vsync signal in a digital TV comprises obtaining a correlation between a received signal and the vsync signal utilizing a pattern inserted by a transmitting side; detecting the position of a symbol having a maximum correlation in every field to output the detected position; and checking the reliability of the output of the detected maximum value position. In the last step, if the reliability is over a determination threshold value, the position of the symbol detected is recognized as the position of the vsync signal.

According to yet another aspect of the present invention, an apparatus for detecting sync signal in a digital TV detects a vsync signal, the polarity of data, and an odd/even field sync signal from a received digital VSB signal utilizing a correlation between the received digital VSB signal and a prescribed reference vsync signal. Thereafter, the hsync signal is detected from the vsync signal as discussed above.

The apparatus for detecting the sync signals in the digital TV includes a DC eliminator eliminating DC from the received VSB signal; a sync signal detecting unit generating various sync signals for use in correlating the DC-eliminated VSB signal with the reference vsync signal; and a polarity corrector correcting the polarity of the DC-eliminated VSB signal using the polarity detected in the sync signal detecting unit.

The sync signal detecting unit comprises a vsync correlator obtaining the correlation of the DC-eliminated VSB signal with the reference vsync signal; a maximum value position detector detecting the position and polarity of a symbol having a maximum correlation with the reference vsync signal for every field; a reliability measurer preventing an inaccurate detection of the polarity and the vsync signal; a sync signal generator generating the various synchronizing signals.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the embodiments of the present invention, examples of which are illustrated in the accompanying drawings.

In the embodiments of the present invention, the transmission signal has a frame structure as shown in FIG. 1. However, once a vsync signal is detected, the position of the hsync signal can be readily determined from the general data at a position relative to the vsync signal. Although the vsync signal is transmitted every field rather than every segment like the hsync signal, the vsync signal is made of a large number of symbols such that the detection of the vsync signal can be achieved in a relatively easy manner even if a damage to the channel is serious. Also, the VSB signal of the received signal may have an opposite polarity, but the correct polarity can easily be determined during the detection of the vsync signal. Thus, the synchronization at the receiving side may be performed in a stable manner, allowing an effective data recovery.

Figure 3:
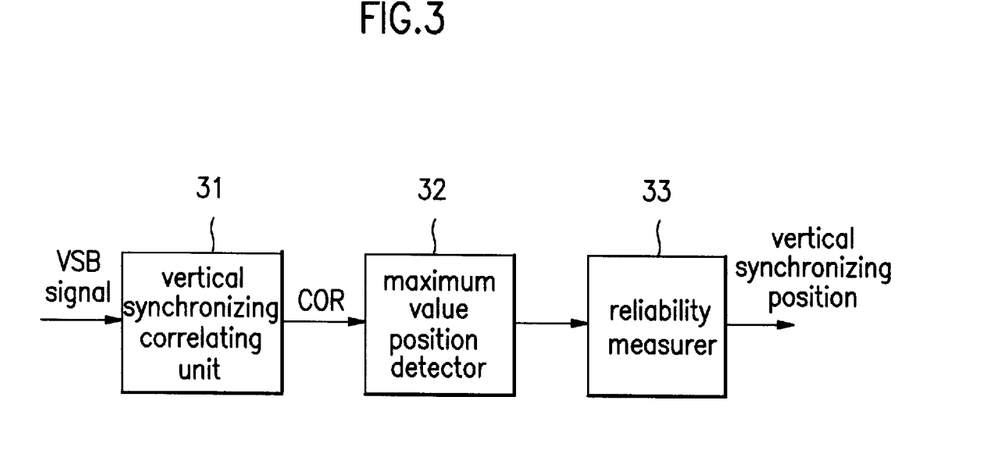
FIG. 3 is a block diagram of a vsync signal detecting apparatus in a digital TV according to a first embodiment of the present invention.

FIG. 3 is a block diagram illustrating the structure of a vsync signal detecting apparatus in a digital TV according to the first embodiment of the present invention. As shown, the apparatus for detecting the vsync signal comprises a vsync correlating unit 31 obtaining the correlation (COR) between a received VSB signal and a previously determined vsync signal; a maximum value position detector 32 detecting and outputting the position of a symbol having a maximum correlation in every field based upon the obtained COR; and a reliability measurer 33 preventing an inaccurate position determination of the vsync signal.

Figure 4:
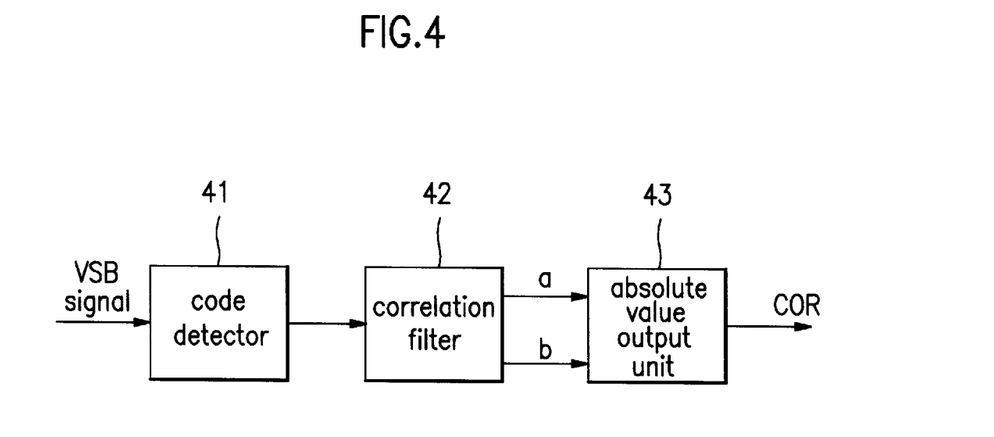
FIG. 4 is a block diagram of a vsync correlating unit of FIG. 3.

The vsync correlating unit 31 as shown if FIG. 4 comprises a code detector 41 detecting and obtaining codes of the received VSB signal; a correlation filter 42 comparing the obtained codes with a stored reference code pattern of the vsync signal value at each tap of the filter, and adding the outputs of the comparison; and an absolute value output unit 43 assigning an absolute value to the output of the correlation filter 42. The reference pattern used in the comparison is a predetermined pattern equivalent to the code pattern of the vsync signal inserted at the transmitted side.

Particularly, the vsync correlating unit 31 utilizes all or a part of the training sequence which refers to hsync signal of 4 symbols, PN511 signal sequence of 511 symbols, and three PN63 signal sequences of 189 (63×3) symbols. If the input VSB signal code is larger than a reference value, the code detector 41 of the vsync correlating unit 31 generally determines the input VSB signal code value as '+', but if smaller than the reference value, the code value is determined to be '−'. Thus, the code detector 41 outputs the determined values to the correlation filter 42.

The correlation filter 42 sets the coefficient at each tap as a vsync signal pattern shown in FIG. 2. Accordingly, the values in the correlation filter 42 corresponds to the hsync signal of 4 symbols, the PN511 signal sequence of 511 symbols, and three PN63 signal sequences of 189 (63×3) symbols. If the input signal code, i.e. the VSB signal code, coincides with the reference coefficient code at a tap of the correlation filter 42, a value of '1' is output, otherwise a value of '0' is output.

The larger the sum of each tap is, the higher the probability that the input signal code is the vsync signal. Moreover, since the vsync signal may have an opposite polarity due to the result of a demodulator, the probability that the input signal code is the vsync signal is high even when the sum of each tap is small. This is because the input signal codes would not coincide with the reference coefficient codes at every tap within a vsync signal interval, if the polarity is opposite.

Also, since the second PN63 signal sequence has an inverted polarity every other field, the sum in each tap is separately output from the correlation filter 42. Therefore, there are two output values 몃☐ and 벴☐ of the correlation filter 42, given by the following mathematical Equation (1) below.

$$a = \sum \text{correlation value with hsync} +$$
$$\sum \text{correlation value with PN511} +$$
$$2\sum \text{correlation value with PN 63}$$
$$b = \sum \text{correlation value with PN63}$$

In Equation (1), the maximum number of taps in the correlation filter 42 is 704 (4+511+(3×63)). However, the maximum number may be adjusted depending upon the performance of the filter. Thus, if the number of total taps in the correlation filter 42 is N and M number of taps are separately calculated, the value of 'a' ranges from 0 to (N–M) while the value of 'b' ranges from 0 to M. For example, assuming that N is 704 and the M is 63, the value of 'a' ranges between 0~641 (704–63) and the value of 'b' ranges between 0~63.

If the input signal code coincides with the reference coefficient code at every tap of the correlation filter 42, the values of 'a' and 'b' (M–N, N) would be large. On the other hand, if the input signal code does not coincide with the reference code at every tap, the values of 'a' and 'b' would be '0'. In such case, the input signal is determined to be the vsync signal with the opposite polarity. As a result, an intermediate value $$\left(\frac{N-M}{2} \text{ or } \frac{M}{2}\right)$$

between '0' and the largest value (i.e. 641 for 'a' and 63 for 'b') has the highest probability that the vsync signal is not position at the corresponding input signal interval.

Because the vsync signal may have an inverted polarity, an absolute value of the results of the correlation filter 42 is taken by the absolute value output unit 43, thereby outputting an absolute value of the processed result to the maximum value position detector 32. Particularly, the absolute value of 'a' may be obtained by the following Equation (2) or (3).

$$|a| = \left|x - \left\lceil \frac{N-M}{2} \right\rceil\right| \quad (2)$$

$$|a| = \left|x - \left\lfloor \frac{N-M}{2} \right\rfloor\right| \quad (3)$$

The absolute value of 'b' may be obtained by the following Equation (4) or (5).

$$|b| = \left|y - \left\lceil \frac{M}{2} \right\rceil\right| \quad (4)$$

$$|b| = \left|y - \left\lfloor \frac{M}{2} \right\rfloor\right| \quad (5)$$

In Equations 2~5, 'x' represents the value 'a' and 'y' represents the value 'b' from Equation (1). The function $\lceil * \rceil$ indicates a maximum integer less than '*' and $\lfloor * \rfloor$ indicates a minimum integer greater than '*'. For example $\lceil 1.5 \rceil$ represents '1' and $\lceil 1.5 \rceil$ represents '2'. Note that the value of $$\frac{N-M}{2} \text{ or } \frac{M}{2}$$

is not necessarily an integer.

When the correlation filter 42 outputs two values 'a' and 'b', the absolute value output unit may use both values 'a' and 'b' or use only the value 'a' for calculating the absolute value and outputting the COR value, shown in Equations (6) and (7) below.

$$\text{absolute value} = |a| + |b| \quad (6)$$

$$\text{absolute value} = |a| \quad (7)$$

Figure 5:
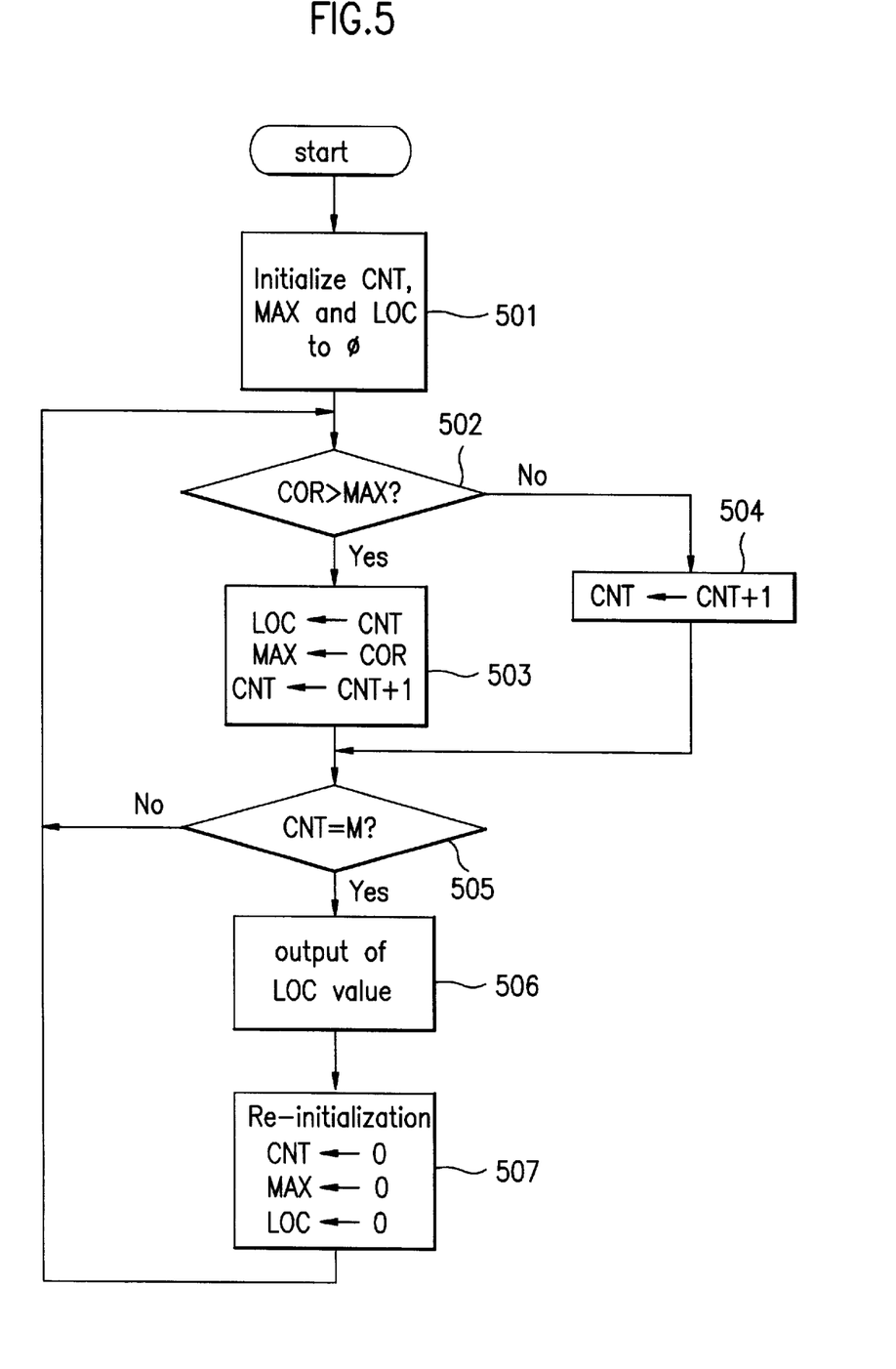
FIG. 5 is a flowchart illustrating an operation of a maximum value position detector of FIG. 3.

Accordingly, the maximum value position detector 32 then detects the position of the symbol having a highest correlation with the vsync signal within one field. FIG. 5 shows a flowchart of the operation of the maximum value position detector 32. The maximum value position detector 32 includes a register CNT which stores the positions of symbols within one field, a register MAX which stores the maximum value of the output of vsync correlating unit 31, and a register LOC which stores the position of symbol having a highest correlation with the vsync signal. If the number of symbols within one field is M, for example 'M'=832×313=260416, the operation of the maximum value position detector 32 for an output value COR from the vsync correlating unit 31 will next be discussed.

First, the registers CNT, MAX, and LOC are initialized to '0' (step 501) and then a determination is made whether the output value COR is higher than the value stored in the register MAX (step 502). If the value COR is less or equal to the value in the register MAX, the value in the register CNT increases by '1' (step 504). However, if the value of COR is greater than the value in the register MAX, the value in the register CNT is stored in the register LOC, the value COR is stored in the register MAX, and the value in the register CNT increases by '1' (step 503).

Thereafter, a determination is made whether the value in register CNT is equal to 'M' (step 505). If the value in register CNT is not equal to M, the process continues in step 502. If the value in register CNT is equal to the value 'M', the maximum value position detector 32 has completed detecting the position of the vsync signal for one field. As a result, the maximum value position detector 32 outputs the value in the register LOC to the reliability measurer 33 (step 506) since the register LOC stores the position of symbol having a highest correlation with the vsync signal. Plus, the registers CNT, MAX, and LOC are re-initialized to '0' and the operation returns to step 502 for the next field.

The reliability measurer 33 is an auxiliary unit to determine whether the position of the vsync signal detected by the maximum value position detector 32 is accurate. Although the first embodiment includes the reliability measurer 33, such unit may be omitted to simply the vsync detecting process of the present invention.

Figure 6:
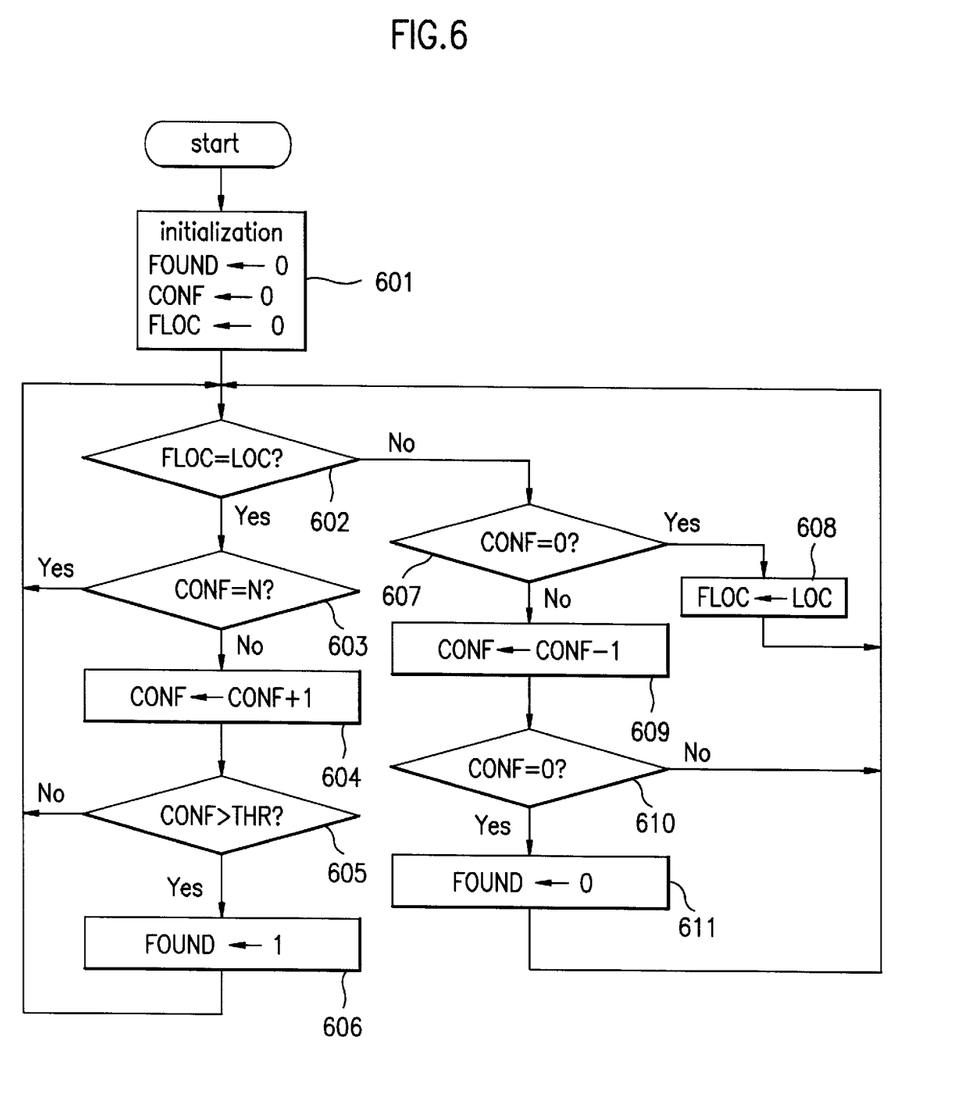
FIG. 6 is a flowchart illustrating an operation of a reliability measurer of FIG. 3.

FIG. 6 is the flowchart of the operation of the reliability measurer 33. The reliability measurer 33 includes a register FLOC which stores the position of vsync signal, a register CONF which stores the number of times a position of vsync signal is stored in the register FLOC, and a register FOUND for determining whether a reliable vsync signal has been detected. When the maximum value position detector 32 outputs the value stored in the register LOC, the reliability measurer is activated and operates as discussed below.

First, the registers FLOC, CONF, and FOUND are initialized to '0' (step 601) and then a determination is made whether the value in the register FLOC is equal to the value from the register LOC for every field (step 602). If the values in the registers FLOC and LOC are equal, the probability that the position stored in the register FLOC corresponds to the position of the vsync signal increases, thereby increasing the reliability. Thus, if the values are equal, a determination is made whether the value in register CONF is equal to the maximum value of the register CONF N (step 603).

If the value in register CONF is equal to the maximum value N, the value of the reliability cannot be further increased, and the process returns to step 602. However, if the value in register CONF is not equal to the maximum value N, the value in register CONF increases by '1' (step 604). Thereafter, a determination is made whether the value in register CONF is equal to a predetermined threshold value THR (step 605).

If the value in register CONF is less or equal to the threshold value THR, the process returns to step 602. However, if the value in register CONF is greater than the threshold value THR, a reliable vsync signal has been detected. Accordingly, the value in register FOUND is changed from '0' to '1' (step 606) and the process returns to step 602. The value of '1' in register FOUND indicates that a reliable position of the vsync signal has been detected.

In the above process, the predetermined threshold value THR is variable and may be set according to the needs of the digital TV system. Namely, the greater the value of THR is, the greater the reliability of the vsync signal. However, the greater the value of THR, the longer it would be to detect the vsync signal. Also, although the embodiment as described includes steps 601~606, step 603 may be omitted to simply the process.

If, at the step 602, the values in the registers FLOC and LOC are not equal, the probability that the position stored in the register FLOC corresponds to the position of the vsync signal decreases, thereby decreasing the reliability. Thus, if the values are not equal, a determination is made whether the value in register CONF is equal to the minimum value of the register CONF '0' (step 607). If the value in register CONF is equal to '0', the value of the reliability cannot be decreased indicating that the stored position of the vsync signal is unreliable or that the reliability measurer 33 has been newly activated. Accordingly, the value in register CONF remains '0' and the value in register LOC is stored in the register FLOC as the new position value of the vsync signal (step 608). Afterwards, the process returns to step 602 for further processing.

If the value in register CONF is not equal to '0', the value in register CONF decreases by '1' (step 609). A determination is then made whether the value in register CONF is equal to the minimum value of '0' (step 610). If the value in register CONF is not equal to the minimum value '0', the process returns to step 602. However, if the value in register CONF is equal to '0', the detected vsync signal position is not reliable. Thus, the value in register FOUND is changed from '1' to '0' and returns to step 602 (step 611).

In the above operation of the reliability measurer 33, rather than steps 610~611, the value in register FOUND may be changed from '1' to '0' at step 605 prior to step 602, if the value in register CONF is not greater than the threshold value THR. In such case, after decreasing the value in register CONF by '1' in step 609, the process would return to step 602.

The outputs of the reliability measurer 33 corresponds to the value in the register FOUND for determining whether the vsync signal position detected and stored in the register FLOC is reliable. Therefore, a value of '1' the register FOUND indicates that the vsync signal has been properly detected, and the value in the register FLOC determines the position of the vsync signal.

As the transmission signal frame structure shown in FIG. 1 is defined under a predetermined standard, the position of the hsync signal can be detected at a position relative to the detected vsync signal. The position of the hsync signal can even be detected utilizing a counter, without a separate hsync signal detector. Moreover, the position of the next vsync signal following the detected vsync signal can be detected at a position relative to the detected vsync signal also by using a counter, allowing a relatively easy and reliable data recovery.

Figure 7:
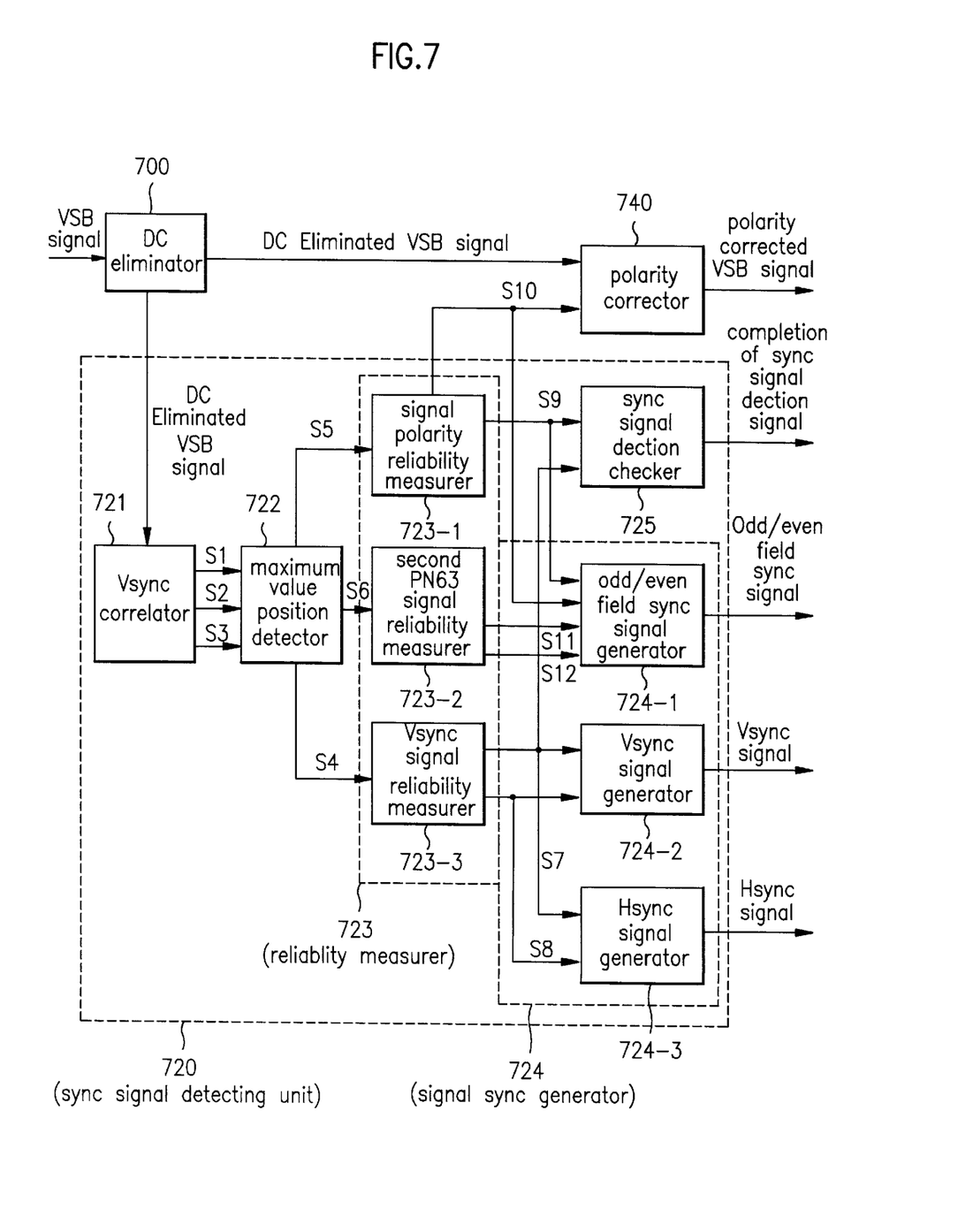
FIG. 7 is a block diagram of sync signals detecting apparatus in a digital TV according to a second embodiment of the present invention.

Alternatively, FIG. 7 shows a block diagram of an apparatus for detecting sync signal in a digital TV according to a second embodiment of the present invention. In this embodiment, a vsync signal, the polarity of data, and an odd/even field sync signal are detected from a received digital VSB signal utilizing a correlation between the received digital VSB signal and a prescribed reference vsync signal. Thereafter, the hsync signal is detected from the vsync signal as discussed above.

The apparatus for detecting the sync signals in the digital TV according to the second embodiment of the present invention includes a DC eliminator 700 eliminating DC from the received VSB signal; a sync signal detecting unit 720 generating various sync signals for use in correlating the DC-eliminated VSB signal with the reference vsync signal; and a polarity corrector 740 correcting the polarity of the DC-eliminated VSB signal using the polarity detected in the sync signal detecting unit 720.

Also, the sync signal detecting unit 720 comprises a vsync correlator 721 obtaining the correlation of the DC-eliminated VSB signal with the reference vsync signal; a maximum value position detector 722 detecting the position and polarity of a symbol having a maximum correlation with the reference vsync signal for every field; a reliability measurer 723 preventing an inaccurate detection of the polarity and the vsync signal; a sync signal generator 724 generating the various synchronizing signals when the reliability measured in the reliability measurer 723 is over a threshold value; and a sync signal detection checker 725 informing the completion of the sync signal detection based upon the output of the reliability measurer 723.

The reliability measurer 723 includes a signal polarity reliability measurer 723-1 checking for each field whether the polarity 'S5' of the signal detected in the maximum value position detector 722 is repeated; a second PN63 signal reliability measurer 723-2 checking for each field whether the polarity 'S6' of the second PN63 signal sequence detected in the maximum value position detector 722 is inverted; and a vsync signal reliability measurer 723-3 checking for each field whether the position 'S4' of the symbol detected in the maximum value position detector 722 is repeated. Furthermore, the sync signal generator 724 includes an odd/even field sync signal generator 724-1, a vsync signal generator 724-2, and a hsync signal generator 724-3.

The operation of the sync signal detecting apparatus according to the second embodiment of the present invention will next be explained.

The DC eliminator 700 first eliminates the DC from the received VSB signal and outputs DC-eliminated signal to the sync signal detecting unit 720 and to the polarity corrector 740. Particularly, the VSB signal to be transmitted passes through a mapper at the transmitting side such as a broadcasting station, by which the signal is changed to a desired power level. At this time, a predetermined constant called the DC is added to the output of the mapper. The insertion of the DC allows the receiving side to more accurately demodulate the transmitted VSB signal. As a result, the VSB signal received by a receiving side has a different level of amplitude from its original level of amplitude and the DC is eliminated to detect the sync signals.

The vsync correlator 721 of the sync signal detecting unit 720 obtains the correlation of the DC-eliminated VSB signal with the reference vsync signal by using all or a part of the training sequence. Similar to the first embodiment, the vsync correlator 721 detects and obtains codes of the received VSB signal; compares the obtained codes with a stored reference code pattern of the vsync signal value at each tap of a filter, and adds the outputs of the comparison; and assigns an absolute value to the correlation value. Thus, the vsync correlator 721 outputs to the maximum value position detector 722 an absolute value of the correlation 'S1.' The vsync correlator 721 further obtains a polarity 'S2' of the received DC-eliminated VSB signal and separately obtains a polarity 'S3' of the received DC-eliminated VSB symbol at an interval corresponding to the second PN63 signal sequence in the reference vsync signal. The polarities 'S2' and 'S3' are also output to the maximum value position detector 722.

In more detail, the vsync correlator 721 includes a finite impulse response (FIR) filter having a maximum of 704 taps. The tap coefficients of the filter are a polarity (code) values including the hsync signal of 4 symbols, the PN511 signal sequence of 511 symbols, and three PN63 signal sequence of 189 symbols. Although the maximum number of taps in the FIR filter is 704 (4+511+(3×63)), the number may be substantially reduced in consideration of the circuit complexity. Thus, the vsync correlator 721 sets the coefficient at each tap as all or part of the train sequence and the polarity value of every DC-eliminated VSB signal symbol is input to the vsync correlator 721.

If the input signal code coincides with the reference coefficient code at every tap of the FIR filter in the vsync correlator 721, a value of '1' is output. Contrarily, if the input signal code and the reference coefficient do not coincide, a value of '0' is output. The larger the sum of each tap is, the higher the probability that the input signal code is the vsync signal. Moreover, since the vsync signal may have an opposite polarity due to the result of a demodulator, the probability that the input signal code is the vsync signal is high even when the sum of each tap is small. This is because the input signal codes would not coincide with the reference coefficient codes at every tap within a vsync signal interval, if the polarity is opposite.

Also, since the second PN63 signal sequence has an inverted polarity in every other field, the sum in each tap is separately output from the FIR filter. Therefore, there are two output values 'a' and 'b' of the FIR filter, given by Equation (1) above.

Therefore, assuming the maximum number of taps in the FIR filter is N and the number of taps separately calculated is M, the value of 'a' ranges from 0 to (N–M) while the value of 'b' ranges from 0 to M. For example, assuming that N is 704 and the M is 63, the value of 'a' ranges between 0~641 (704–63) and the value of 'b' ranges between 0~63.

If the input signal code coincides with the reference coefficient code at every tap of the FIR filter 42, the values of 'a' and 'b' (M–N, N) would be large. On the other hand, if the input signal code does not coincide with the reference code at every tap, the values of 'a' and 'b' would be '0'. In such case, the input signal is determined to be the vsync signal with the opposite polarity. As a result, an intermediate value $$\left(\frac{N-M}{2} \text{ or } \frac{M}{2}\right)$$

between '0' and the largest value (i.e. 641 for 'a' and 63 for 'b') has the highest probability that the vsync signal is not position at the corresponding input signal interval.

Furthermore, if the value 'a' or 'a+b' of the vsync correlator 721 is larger than the intermediate value $$\left(\frac{N-M}{2} \text{ or } \frac{M}{2}\right),$$

the polarity of the input signal is determined not to be inverted, such that a value of '1' indicating a positive polarity is output as 'S2' to the maximum value position detector 722. Contrarily, if the value 'a' or 'a+b' is smaller than the intermediate value, the polarity of the input signal is determined to be inverted, and a value of '0' indicating a negative polarity is output to the maximum value position detector 722.

On the other hand, if the value 'b' is larger than the intermediate value (M/2), the polarity of the second PN63 signal sequence is determined not to be inverted, such that a value of '1' indicating a positive polarity is output as 'S3' to the maximum value position detector 722. If the value 'b' is smaller than the intermediate value (M/2), the polarity of the second PN63 signal sequence is determined to be inverted, and the value '0' indicating a negative polarity is output to the maximum value position detector 722.

Because the vsync signal may have an inverted polarity, an absolute value of the results of the FIR filter is taken, thereby outputting an absolute value of the processed result 'S1' to the maximum value position detector 722. Particularly, the absolute value may be executed using both the values 'a' and 'b' or just the value of 'a' by Equations (2) or (3) and Equations (4) or (5) above.

The maximum value position detector 722 then detects the position of the symbol having a highest correlation with the reference vsync signal for each field. Namely, the maximum value position detector 722 can output a position of the having a highest correlation by executing the operation described with reference to the maximum value position detector 32 of the first embodiment shown in FIG. 5. Thus, using a counter to keep track of the position of each symbol in a field and using a comparator, the maximum value position detector 722 compares the correlation values 'S1' output for every symbol of the vsync signal in a field.

Accordingly, a symbol position 'S4' having the highest correlation among the outputs is detected and output to the vsync signal reliability measurer 723-3. Also, the polarity 'S5' of the signal at the symbol position 'S4' is detected and output to the signal polarity reliability measurer 723-1. Furthermore, the maximum value position detector 722 detects and outputs the polarity 'S6' of the second PN63 signal sequence to the second PN63 signal sequence polarity reliability measurer 723-2. The polarity 'S6' is determined positive if more of the 'S3' values received are '1's.

The reliability measurer 723 generally prevents an inaccurate detection of the vsync signal due to a data arrangement having a large correlation with the vsync signal. The vsync signal reliability measurer 723-3, the signal polarity reliability measurer 723-1, and the second PN63 signal sequence polarity reliability measurer 723-2 may each determine the reliability of the maximum value position detector 722 by executing an operation analogous to the operation described with reference to the reliability measurer 33 of the first embodiment as shown in FIG. 6.

Particularly, the vsync signal reliability measurer 723-3 determines whether the symbol position 'S4' output by the maximum value position detector 722 is repeated for each field. If the symbol position 'S4' is repeated, a value of a reliability counter increases. Otherwise, the value of the reliability counter decreases. The vsync signal reliability measurer 723-3 then checks whether the value of the reliability counter is over a predetermined threshold value.

Once the value is over the predetermined threshold value, the vsync signal reliability measurer 723-3 generates a vsync reliability signal 'S7.' The vsync reliability signal 'S7' and the symbol position 'S8' of the vsync signal are output to both the vsync signal generator 724-2 and the hsync signal generator 724-3. The vsync reliability signal 'S7' is also output to the sync signal detection checker 725.

Similarly, the signal polarity reliability measurer 723-1 determines whether the polarity 'S5' of signals detected by the maximum value position detector 722 is repeated in each field. If the polarity '5' is repeated, a value of a reliability counter increases and otherwise, the value of the reliability counter decreases. The signal polarity reliability measurer 723-1 checks whether the value of the reliability counter is over a predetermined threshold value. Once the value of the reliability counter is over the predetermined threshold value, the signal polarity reliability measurer 723-1 signal generates and outputs a polarity reliability signal 'S9' to the sync signal detection checker 205. Also, the polarity signal 'S10' corresponding to the polarity reliability signal 'S9' is output to the polarity corrector 740.

If the polarity signal 'S10' is positive, the polarity corrector 740 outputs the DC-eliminated digital VSB signal without change. If the polarity signal 'S10' is negative, the DC-eliminated digital VSB signal is inverted and output as a signal with a positive polarity.

Analogous to the signal polarity reliability measurer 723-1 and the vsync signal reliability measurer 723-3, the second PN63 signal sequence polarity reliability measurer 723-2 determines whether the polarity 'S6' of the second PN63 signal sequence detected by the maximum value position detector 722 is repeated in each field. If the polarity 'S6' is repeated, a value of a reliability counter increases and otherwise, the value decreases. The second PN63 signal sequence polarity reliability measurer 723-2 then checks whether the value of the reliability counter is over a predetermined threshold value. Once the value of the reliability counter is over the predetermined threshold value, the second PN63 signal sequence polarity reliability measurer 723-2 generates an odd/even field sync reliability signal 'S11.' The odd/even filed sync reliability signal 'S11' and the polarity signal 'S12' of the second PN63 signal sequence corresponding to the odd/even filed sync reliability signal 'S11' are output to the odd/even field sync signal generator 724-1.

Upon receiving the vsync reliable signal 'S7,' the vsync signal generator 724-2 calculates the position of the vsync signal from the position of symbol 'S8' to generate the vsync signal. As discussed above with reference to the first embodiment, the transmission signal frame structure as shown in FIG. 2 is defined under a predetermined standard. Accordingly, the position of the hsync signal can be detected at a position relative to the detected vsync signal without a separate hsync signal detector. Namely, once the 'S7' signal is received, the hsync signal generator 724-3 calculates the position of the hsync signal from the position of symbol 'S8' by using a simple counter to thereby generate the hsync signal.

Moreover, the polarity reliability signal 'S9' and the polarity signal 'S10are input to the odd/even field sync signal generator 724-1. Upon receiving the polarity reliability signal 'S9,' the polarity signal 'S10,' the odd/even filed sync reliability signal 'S11' and the polarity signal 'S12' of the second PN63 signal sequence, the odd/even field sync signal generator 724-1 generates an odd/even field sync signal from the polarity signals 'S10' and 'S12.' Finally, when the sync signal detection checker 725 receives the vsync reliability signal 'S7' and the polarity reliability signal 'S9,' the sync signal detection checker 725 generates a completion signal indicating a successful detection of the sync signals.

As in the first embodiment, the reliability measurer 723 is an auxiliary unit to determine whether the values detected by the maximum value position detector 722 are accurate. Accordingly, the second embodiment may also omit the reliability measurer 723 to simply the sync detecting process of the present invention. In such case, the signals 'S4' would be input directly to the vsync signal generator 724-2 and the hsync signal generator 724-3 to generate the vsync signal and the hsync signal, respectively. The signal 'S5' would be input directly to the polarity corrector 740 for polarity correction as necessary and to the odd/even field sync signal generator 724-1 for the generation of the odd/even field sync signal. Finally, the signal 'S6' would be input directly also to the odd/even field sync signal generator 724-1 for the generation of the odd/even field sync signal. When all the sync signals are generated, the sync signal detection checker 725 would generate the completion signal indicating a successful detection of the sync signals.

In sum, both embodiments of the present invention for detecting a vsync signal in a digital TV detects a vsync signal of high reliability by which a hsync signal and a starting position of data can be detected at a position relative to the detected vsync signal. Thus, the synchronization in a receiving system can be stabilized and the data recovery can be easily performed. Furthermore, the vsync signal can be readily detected even though a damage of the transmission channel is serious. Finally, according to the present invention, the hsync signal can be detected without a separate detector.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital TV receiver for detecting a vertical synchronizing signal comprising:

a vsync correlating unit that obtains a correlation value between a received signal and a reference vsync signal;

a maximum value position detector that detects a vsync position of a symbol having a maximum correlation with the reference vsync signal for each field and outputs said vsync position as the position of the vsync signal;

a reliability measurer that checks the reliability of said vsync position from said maximum value position detector and determines the position of the vsync signal; and     a hsync generator that generates a hsync signal by counting a predetermined number of symbols based on the position of the vsync signal.

2. An apparatus of claim 1, wherein said reliability measurer confirms said detected vsync position as the position of the vsync signal if a number of times the maximum value position detector outputs said vsync position is greater than a predetermined value.

3. An apparatus of claim 1, wherein said vsync correlating unit includes:

a code detector that detects codes of the received signal;

a correlation filter that compares the detected codes with codes of the reference vsync signal at each tap of the filter, said correlation filter adding and outputting the comparison results; and an absolute value output unit that assigns an absolute value to the output of the correlation filter.

4. An apparatus of claim 3, wherein said correlation filter separately produces an added value at each tap in a PN63 signal sequence interval.

5. An apparatus of claim 3, wherein said absolute value output unit assigns the absolute value by dividing the total number of taps in said correlation filter by 2 to generate a quotient and by subtracting the quotient from the output value of said correlation filter.

6. An apparatus of claim 1, wherein said vsync position output as the position of the vsync signal is used to detect the vsync signal of a next field at a position relative to said vsync position.

7. An apparatus of claim 1, further comprising:

a DC eliminator that eliminates DC from a received signal and outputs the DC-eliminated signal to the vsync correlating unit; and a polarity corrector that receives the DC-eliminated signal and a vsync polarity of the DC-eliminated signal, said polarity corrector correcting the polarity of the DC-eliminated signal using the vsync polarity and outputting a polarity corrected signal;

wherein said vsync correlating unit further obtains and outputs to the maximum value position detector a polarity of the DC-eliminated signal at each symbol position, and obtains and outputs to the maximum value position detector a polarity of the DC-eliminated signal at symbol positions corresponding to a second PN63 signal sequence; and wherein said maximum value position detector further detects the vsync polarity at a symbol position corresponding to said vsync position and detects a PN63 polarity of a second PN63 signal sequence; said maximum position detector outputting the vsync polarity and the PN63 polarity.

8. An apparatus of claim 9, wherein the reliability measurer determines the reliability of said vsync position, said vsync polarity and said PN63 polarity from said maximum value position detector; said reliability measurer outputting at least one reliability signal and at least one output of said maximum value position detector if said one output meets a predetermined condition.

9. An apparatus of claim 8, wherein the reliability measurer comprises:

a signal polarity reliability measurer that receives and outputs said vsync polarity if a number of times the maximum value position detector outputs said vsync position is greater than a first predetermined value, said signal polarity reliability measurer also outputting a first polarity reliability signal with said vsync polarity;

a second PN63 signal reliability measurer that receives and outputs said PN63 polarity if a number of times the maximum value position detector outputs said position is greater than a second predetermined value, said second PN 63 signal reliability measurer also outputting a second polarity reliability signal with said PN63 polarity; and a vsync signal reliability measurer that receives and outputs said vsync position if a number of times the maximum value position detector outputs said position is greater than a third predetermined value, said vsync signal reliability measurer also outputting a vsync reliability signal with said vsync position.

10. An apparatus of claim 9, further comprising a sync signal detection checker that outputs a sync signal detection complete signal if both the first reliability signal and the vsync reliability signal are received.

11. An apparatus of claim 9, further comprising a sync signal generator that generates a vsync signal and a hsync signal using said vsync position if the vsync reliability signal is received, and generates an odd/even field sync signal using said PN63 polarity if the second polarity reliability signal is received, said sync signal generator outputting the generated vsync signal, the hsync signal and the odd/even field sync signal.

12. A method for detecting a vertical synchronizing signal in a digital TV comprising:

(a) obtaining a correlation between a received signal and a reference vsync signal;

(b) detecting a vsync position of a symbol having a maximum correlation with the reference vsync signal for every field and outputting said vsync position as the position of the vsync signal;

(c) checking the reliability of said vsync position and determining the position of the vsync signal; and (d) generating a hsync signal based on the position of the vsync signal.

13. A method of claim 12, wherein in (c), outputting said vsync position as the position of the vsync signal if a number of times said vsync position is output is greater than a predetermined value.

14. A method of claim 12, wherein obtaining the correlation in (a) comprises:

detecting codes of the received signal;

comparing the detected codes with codes of the reference vsync signal at each tap of a correlation filter, adding and outputting the comparison results; and assigning an absolute value to the output of the correlation filter.

15. A method of claim 14, wherein comparing the detected codes further comprises separately producing an added value at each tap in a PN63 signal sequence interval.

16. A method of claim 12, further comprising:

(e) eliminating DC from a received signal prior to (a); and (f) correcting the polarity of the received signal using a vsync polarity of the received signal and outputting a polarity corrected signal;

wherein (a) further includes obtaining a polarity of the received signal at each symbol position, and obtaining a vsync polarity of the received signal at symbol positions corresponding to a second PN63 signal sequence; and wherein (b) further includes detecting the vsync polarity at a symbol position corresponding to said vsync position and detecting a PN63 polarity of a second PN63 signal sequence, and outputting the vsync polarity and the PN63 polarity.

17. A method of claim 16, further comprising:

(g) determining the reliability of said vsync position, said vsync polarity and said PN63 polarity; and (h) outputting at least one reliability signal and at least one output of a maximum value position detector if said one output meets a predetermined condition.

18. A digital TV receiver for detecting a vertical synchronizing signal comprising:

a vsync correlating unit that obtains a correlation value between a received signal and a reference vsync signal; and a maximum value position detector that detects a vsync position of a symbol having a maximum correlation with the reference vsync signal for each field and outputs said vsync position as the position of the vsync signal;

wherein said vsync correlating unit includes:
- a code detector that detects codes of the received signal;
- a correlation filter that compares the detected codes with codes of the reference vsync signal at each tap of the filter, said correlation filter adding and outputting the comparison results; and
- an absolute value output unit that assigns an absolute value to the output of the correlation filter.

19. A digital TV receiver for detecting a vertical synchronizing signal comprising:

a vsync correlating unit that obtains a correlation value between a received signal and a reference vsync signal;

a maximum value position detector that detects a vsync position of a symbol having a maximum correlation with the reference vsync signal for each field and outputs said vsync position as the position of the vsync signal;

a DC eliminator that eliminates a DC from a received signal and outputs the DC-eliminated signal to the vsync correlating unit; and a polarity corrector that receives the DC-eliminated signal and a vsync polarity of the DC-eliminated signal, said polarity corrector correcting the polarity of the DC-eliminated signal using the vsync polarity and outputting a polarity corrected signal;

wherein said vsync correlating unit further obtains and outputs to the maximum value position detector a polarity of the DC-eliminated signal at each symbol position, and obtains and outputs to the maximum value position detector a polarity of the DC-eliminated signal at symbol positions corresponding to a second PN63 signal sequence.

20. A digital TV receiver of claim 19, wherein said maximum value position detector further detects the vsync polarity at a symbol position corresponding to said vsync position and detects a PN63 polarity of a second PN63 signal sequence; said maximum position detector outputting the vsync polarity and the PN63 polarity.

21. A method for detecting a vertical synchronizing signal in a digital TV comprising:

(a) obtaining a correlation between a received signal and a reference vsync signal; and (b) detecting a vsync position of a symbol having a maximum correlation with the reference vsync signal for every field and outputting said vsync position as the position of the vsync signal;

wherein obtaining the correlation in (a) comprises:
- detecting codes of the received signal;
- comparing the detected codes with codes of the reference vsync signal at each tap of a correlation filter, adding and outputting the comparison results; and
- assigning an absolute value to the output of the correlation filter.

22. A method for detecting a vertical synchronizing signal in a digital TV comprising:

(a) obtaining a correlation between a received signal and a reference vsync signal;

(b) detecting a vsync position of a symbol having a maximum correlation with the reference vsync signal for every field and outputting said vsync position as the position of the vsync signal;

(c) eliminating DC from a received signal prior to (a); and (d) correcting the polarity of the received signal using a vsync polarity of the received signal and outputting a polarity corrected signal;

wherein (a) further includes obtaining a polarity of the received signal at each symbol position, and obtaining a vsync polarity of the received signal at symbol positions corresponding to a second PN63 signal sequence.

23. A method of claim 22, wherein (b) further includes detecting the vsync polarity at a symbol position corresponding to said vsync position and detecting a PN63 polarity of a second PN63 signal sequence, and outputting the vsync polarity and the PN63 polarity.

* * * * *